Jan. 18, 1938. R. D. JUNKINS 2,106,030
MEASURING AND CONTROLLING APPARATUS
Filed June 26, 1934
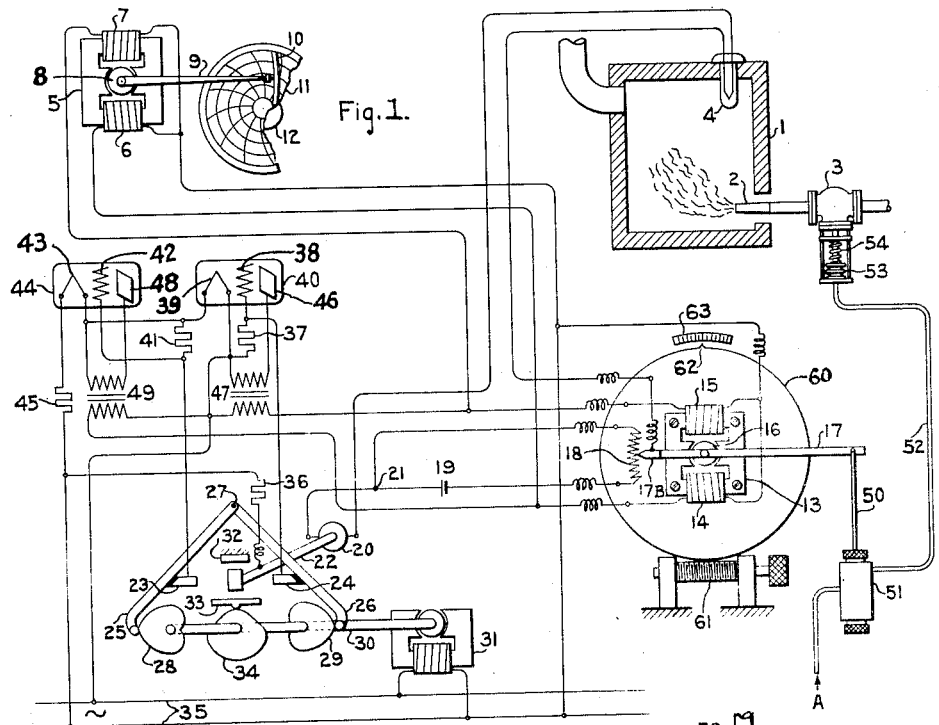
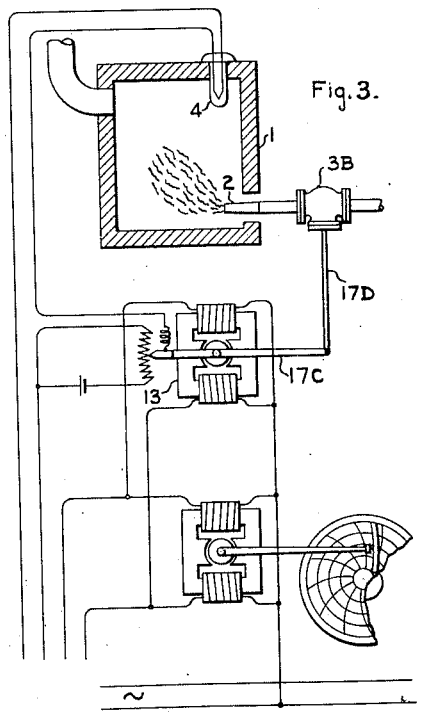
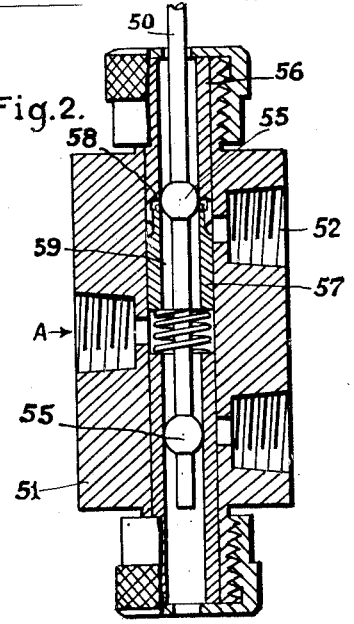
INVENTOR
Raymond D. Junkins.
BY
ATTORNEY Patented Jan. 18, 1938

2,106,030

UNITED STATES PATENT OFFICE 2,106,030

MEASURING AND CONTROLLING APPARATUS

Raymond D. Junkins, Cleveland Heights, Ohio, assignor to Bailey Meter Company, a corporation of Delaware Application June 26, 1934, Serial No. 732,477

5 Claims. (Cl. 236—84)

This invention relates to the art of measuring and/or controlling the magnitude of a variable quantity, condition, relation, etc., and particularly such variables as temperature, pressure, rate of fluid flow, etc., although the variable may be of any physical, chemical, electrical, hydraulic, thermal or other characteristic.

According to the invention, I produce an effect (preferably an electrical effect) varying in known proportion to the magnitude of a variable condition whose magnitude or variation I desire to measure and/or control. Such effect may be a small force, such as an electromotive force produced by a thermocouple, and may be magnified to any desired degree.

The electrical effect representative of the magnitude of a variable is utilized in novel and amplified manner to effect a measuring of the variable and simultaneously is utilized to control an amplified fluid pressure for remotely regulating the variable being measured or another variable whose change in value, due to the regulation, may or may not be effective in changing the value of the variable being measured. It is not essential that the force under control for remotely regulating the variable be a fluid pressure, but may be electrical or otherwise, as desired.

A further object is the provision that a decrease or increase in the value of a condition may be made to effect an electrical or mechanical manifestation of greater or lesser intensity, or for a longer or shorter time than for equal increase or decrease in the value of the condition, or vice versa. That is, if the magnitude of the variable departs in one direction from predetermined value, the effect produced representative of the value of the variable may be different in duration from that if the variable deviated from predetermined value in the opposite direction.

A specific object of the invention is the provision of a thermocouple sensitive to temperature, for periodically indicating and/or recording the magnitude of said temperature, and simultaneously utilizing the electromotive force generated by the thermocouple, representative of the temperature, as a control of heating means for varying the temperature. Such control may be through fluid pressure actuated means or otherwise, as will be explained.

Still further objects of the invention will become apparent from the drawings and description relating thereto in connection with preferred embodiments which I have chosen as representative, and wherein variable temperature in the operation of a heating furnace is measured and simultaneously utilized as a control of the supply of fuel to the furnace.

In the drawings:

Fig. 1 is a diagrammatic arrangement of apparatus and electric circuit embodying the invention, in connection with the measurement of temperature in a furnace and a control of the supply of fuel to the furnace by fluid pressure actuated means.

Fig. 2 is a sectional elevation to enlarged scale of a pilot valve.

Fig. 3 is a diagrammatic showing of a portion of Fig. 1 embodying a modification thereof.

Referring first to Fig. 1, I therein illustrate an embodiment of my invention wherein a temperature in the operation of a heating furnace, such for example, as a metallurgical heating furnace 1, is measured for instantaneous reading on an index and for recording upon a continuous record chart. Furthermore, from the inter-relation between the value of such temperature and a predetermined temperature desirably to be maintained, I effect a control of the supply of fuel fed to the furnace 1 through a burner 2, by throttling or controlling the throttled position of a valve 3 located in the fuel oil supply line before the burner 2.

I provide a thermocouple 4 located sensitive to temperature within the furnace 1 in known manner. It will be understood that the thermocouple 4 may be located at any point relative to the furnace or the exit products of combustion therefrom, where it is desired to measure the temperature and/or to control the same relative to a predetermined standard. Furthermore, that the fuel supplied to such a furnace need not be oil, and in fact, need not be a fuel burned in suspension, but the control of fuel supplied by the valve 3 is merely representative of any suitable control of supply of fuel to the furnace 1.

Primarily I periodically effect an indicating and recording of the temperature at 4 and, if necessary, a control of the valve 3. Such periodicity may be so frequent that the result is substantially a continuous recording or indication of the temperature and a substantially continuous control of the valve 3.

The use of thermocouples for the measurement of relatively high temperatures is well known in the art and it is equally well known that the electrical effect obtained thereby is minute and must, of necessity, be amplified mechanically and/or electrically to do useful work, such as recording, indicating and/or controlling. My invention in general contemplates improved electrical circuits and apparatus in combination for causing a substantial amplification of the electrical effect of the thermocouple sensitive to, and representative of, the temperature within the furnace, and wherein such amplification may be utilized for remotely or locally recording, indicating, and/or to control a variable factor or factors in the operation of the furnace.

The electrical effect obtained through the thermocouple 4, indicative of variations in temperature within the furnace, is utilized in a potentiometer circuit, as will be explained here-inafter, for the positioning of a sensitive galvanometer. A mechanically periodically actuated feeling device cooperates with the galvanometer needle for the control, upon departure of temperature from predetermined value, of thermionic or electron discharge devices, whereby the minute electrical effect is amplified or magnified for control of electromagnetic devices, such as motors, which are used as amplified power means for positioning the indicating, recording, and control members.

I show at 5 a motor having opposed field windings 6 and 7 connected in an alternating current circuit, and opposedly wound in a manner such that when the windings 6 and 7 are equally energized, the rotor 8 is not urged to rotation in either direction; but when the windings are unequally energized, rotation of the rotor 8 will occur in predetermined direction. Carried by the rotor 8 for angular positioning thereby, is an indicator arm 9 adapted to cooperate with an index 10 and comprising a marking means arranged to form a continuous record upon a chart 11, driven at a uniform speed by a clock motor 12. The assembly comprising the motor 5 and indicating-recording means is adapted to advise the value of the temperature to which the thermocouple 4 is sensitive.

Similarly, a motor 13 having opposed field windings 14, 15 and a rotor 16 by which is positioned an arm 17, is adapted to effect a control of fluid pressure means for remotely regulating the valve 3. The arrangement is such that the motors 5 and 13 are simultaneously periodically responsive to temperature at the thermocouple 4.

Upon every change in temperature at the thermocouple 4, I effect an angular displacement simultaneously of the rotors 8 and 16 directly proportional to the variation in the thermocouple potential, by substantially de-energizing one or the other of the field windings 6, 7 of the motor 5, and 14, 15 of the motor 13 in a manner to be explained. The field windings 6 and 7 of the motor 5, and 14, 15 of the motor 13, are normally energized whereby the equal opposed torques of the field windings do not urge the respective rotor to rotation. Rotation in desired direction is accomplished through de-energizing one or the other of the opposed field windings. When a de-energized field winding is again energized, the substantially instantaneous application to the related rotor of the opposing torque plugs the motor to a substantially instantaneous stop without overtravel. This arrangement is highly desirable when operating two synchronous motors, such as the motors 5 and 13, so that the motors may be started and stopped together without drifting apart.

It will be observed that the arrangement is such that when temperature of the thermocouple varies, an electromotive force of minute value will be set up in the thermocouple circuit, which, through proper means to be hereinafter described, I amplify for the control of rotation in amount and direction of the motors 5 and 13 simultaneously for indicating and recording the temperature, as well as controlling the fuel supply valve 3 from such temperature. It will be understood that the motors 5 and 13 are provided with the necessary gear reduction from the rotors 8, 16 to the arms 9, 17, although I have not felt it necessary to show such details.

In the circuit of the thermocouple 4, I utilize the well known zero balance or null method. In accordance with this method, the potential developed by the thermocouple is balanced against the fall of potential through a portion of a slide wire potentiometer or resistance of known length and value per unit of length. Upon a change in potential developed by the thermocouple, the galvanometer in the circuit indicates by its needle swing, a departure from balance, and produces indirectly a movement on the slide wire potentiometer whereby a balance of potential is effected. The physical position of the contact point on the slide wire potentiometer may be utilized as an indication of temperature, equivalent to the potential across the thermocouple.

Such is the system in general which I employ. A constant drop in potential is maintained across the slide wire potentiometer resistance 18 by means of a suitable current source 19, and it is evident that the amount or length of resistance necessary to balance the potential generated by the thermocouple will then be proportional to that potential and may, by suitable calibration, be used to determine its magnitude and, correspondingly, the magnitude of the temperature to which the thermocouple is susceptible.

As shown in Fig. 1, a galvanometer diagrammatically indicated at 20 is connected in series with the thermocouple 4, and they together span that part of the potentiometer circuit between the contact arm 17B and a junction point 21. The contact arm 17B comprises an extension of the arm 17, insulated therefrom, and adapted to frictionally engage along the slide wire resistance 18 upon angular positioning of the rotor 16. At the junction point 21, the galvanometer 20 joins the potential source 19 and one terminal of the potentiometer 18. When the difference in potential through that part of the potentiometer circuit between the junction point 21 and the contact 17B is equal to that developed by the thermocouple 4, the galvanometer needle 22 will remain stationary midway between the two movable electric contacts 23 and 24 as shown.

Upon a variation in temperature within the furnace resulting in a corresponding increase or decrease in the potential difference developed by the thermocouple 4, the galvanometer needle 22 will be deflected either to the right or to the left on the drawings, an amount substantially proportional to the variation in temperature. Upon such a deflection of the galvanometer needle 22, periodically engagement will be made between the galvanometer needle and either the contact 23 or the contact 24, with the result that rotation of the rotor 16 will be effected in proper direction to move the contact arm 17B along the slide wire resistance 18 until the difference of potential through that part of the potentiometer circuit between the junction point 21 and the arm 17B, is again equal to that developed by the thermocouple. Simultaneously, the rotor 8 positions the arm 9 relative to the index 10 and chart 11. Simultaneously the rotor 16 will position the arm 17, whereby through control of a fluid pressure, the regulating valve 3 will be positioned in proper direction and amount. It is evident that the amount of movement of the arm 17B will then be proportional to the change in temperature within the furnace and, accordingly, a true indication of the new temperature will be accomplished by position of the arm 9. The simultaneous positioning of the arm 17 will vary the supply of fuel to the furnace in amount and direction whereby the heating of the furnace will be corrected to tend to return the temperature at the thermocouple 4 to predetermined desired value.

I have shown more or less diagrammatically the mechanism through whose agency I am enabled to periodically transmute the mechanical manifestations of the galvanometer needle, of changes in potential generated by the thermocouple connected thereto, into electrical manifestations of constant magnitude but which continue for an increment of time proportional to the mechanical manifestation of the galvanometer needle. This electrical manifestation I then use to control the energization of the motor windings of the motors 5, 13.

Members illustrated as scissors bars 25, 26, both pivoted at 27, are periodically moved toward and away from each other by the agency of similar but oppositely positioned cams 28, 29, rigidly attached to a shaft 30, rotated at constant speed by a continuously operating motor 31. The scissors bars 25, 26 are provided at their lowermost ends with rollers, the one riding the surface of the cam 28 and the other the surface of the cam 29, and the scissors bars further carry, respectively, the contacts 23, 24 insulated therefrom and from each other.

The galvanometer 20 is of the suspended type and properly located relative to a permanent magnet. Normally the needle 22 of the galvanometer is free to deflect in accordance with the difference of potential generated by the source to which the galvanometer is connected and that portion of the potentiometer circuit spanned. Periodically, however, the needle 22 is clamped between a stationary portion 32 and a movable bar 33. The movable bar, properly guided, is reciprocated by means of a constantly revolving cam 34 secured to the shaft 30. Thus periodically upon each revolution of the cam 34, the needle 22 will be clamped lightly between the stationary member 32 and the reciprocating bar 33, and for a portion of each revolution of the cam 34.

Immediately after the needle 22 has been so clamped, the position of the cams 28, 29 relative to the cam 34, is such that the scissors arms 25, 26 move toward each other. When, as shown, the galvanometer needle 22 is in mid-position, indicating balance between the two potentials, the scissors arms 25, 26 will follow the complete periphery of the cams 28, 29, and neither of the contacts 23, 24 will engage the needle 22. However, if the needle is deflected through action of the galvanometer 20, either to the right or to the left, then the adjacent scissors arm will follow the periphery of the associated cam until the contact carried by the scissors arm reaches the needle. Further motion of this scissors arm toward the other will then be prevented by the galvanometer needle, and the engaged contact will remain in engagement with the needle until the scissors arm is again picked up by the associated cam and moved away. At a definite point in the outward travel of the scissors arms, the galvanometer needle 22 will be released from clamping engagement and be free to deflect either further away or return toward the predetermined neutral position, and until it is again clamped and the scissors arms travel toward each other on the next cam cycle of revolution.

It is evident that by proper shaping of the cams 28, 29, the length of time the scissors arms are in contact with the needle 22 may be made directly proportional to the amount of deviation of the needle from the mid-position, which in turn is proportional to the difference of the opposed potentials. If desired, one of the cams, for example, 28, may be made of a different shape than the other cam, for example, 29, whereby the length of contact for a given deflection of the galvanometer needle in one direction may be made different from that for the same amount of deflection of the galvanometer needle in the opposite direction. It is further evident that the cams 28, 29 may be made of any desired shape, so that the length of engagement between the contacts carried by the scissors arms and the galvanometer needle may bear any desired functional relation to the amount of deviation from the neutral or mid-position of the galvanometer needle.

I utilize the feeling and clamping apparatus just described to produce an electrical effect bearing definite relation to the departure of the galvanometer needle from neutral position and for the control of operation of motors 5 and 13. Intermediate between the feeler apparatus and the motors mentioned, and controlled by a minute electrical force originated through engagement of the galvanometer needle 22 with either the contact 23 or the contact 24, I interpose electron discharge devices or thermionic valves for controlling an amplified or substantially greater electrical force to be directly applied to the motors mentioned. Certain features of the motor control circuit, including the electron discharge devices, are described and claimed in the patent to John D. Ryder, No. 2,015,967 issued October 1, 1935. I will now explain the functioning of this apparatus in sufficient detail to be understandable in connection with the present application, although it will be understood that the arrangement is illustrated and described in greater detail in the patent referred to.

Referring again to Fig. 1, the galvanometer needle 22 is connected directly to one side of an alternating current source 35, through a suitable resistor 36 and will, upon engaging the contact 24, for example, change the normal potential relation maintained by an impedance device shown as the resistance 37, between a grid 38 and a cathode 39 of an electron discharge device herein shown as a thermionic valve 40. Likewise, the galvanometer needle is adapted, upon engagement with the contact 23, to change the normal potential relation maintained by an impedance device shown as the resistance 41, between a grid 42 and a cathode 43 of a thermionic valve 44. The current for heating the cathodes 39, 43, which are connected in series, is provided by the alternating-current source 35 through a resistor 45.

The plate or anode 46 of the device 40 is connected to the cathode 39, through an output circuit which is provided with current from the secondary of the transformer 47. Similarly, the anode 48 of the device 44 is connected to its related cathode 43, through an output circuit supplied with current from the secondary of a transformer 49.

The devices 40, 44 are unidirectional in that current flows from the anodes 46, 48 to the related cathodes 39, 43, and if alternating current is applied to the devices, then pulsating direct current or one-half of the alternating current wave passes through each of the devices when the device is conducting. When, as shown, the galvanometer needle 22 is in engagement with neither the contacts 23, 24, then during a portion of each alternating current cycle, the plates or anodes of the devices 40, 44 will bear a positive potential with respect to the cathodes, and the potential relation between the grids and cathodes will be such as to allow passage of current through the output circuit comprising the secondaries of the transformers. During the alternate half cycle of the alternating current wave, the potential of the plates of the two devices 40, 44 will be negative with respect to the potential of their respective cathodes, thereby open circuiting the output circuit of the devices. Thus, a unidirectional half cycle or pulsating direct-current will flow through each of the devices 40, 44 when they are respectively conducting.

If, now, the galvanometer needle deflects either to the right or to the left, due to a change in temperature and corresponding change in thermocouple potential, and for a period of time proportional to the change in temperature as hereinbefore described, it will engage either the contact 23 or the contact 24. Under this condition, and for the period of engagement, the normal potential relation between the cathode and grid of the device 40 or the device 44, according as to whether the contact 24 or the contact 23 is engaged, will be changed. During that portion of the alternating-current cycle when the associated device was normally adapted for passage of unidirectional current, the grid will now be sufficiently negative with respect to its cathode that the output circuit of the device will be open circuited. During the remaining portion of the alternating-current cycle, notwithstanding that the grid will have a positive potential with respect to the potential of the cathode, the device will remain open-circuited inasmuch as the plate will be under a negative potential with respect to the potential of the cathode.

It will therefore be seen that with the galvanometer needle 22 engaging neither of the contacts 23, 24, there will be a unidirectional current flow through the devices 40, 44, and correspondingly, through the secondaries of the transformers 47, 49. But with engagement between the needle 22 and either the contact 23 or the contact 24, one or the other of the devices 40, 44 will be open-circuited for the period of such engagement of contacts.

As illustrated in Fig. 1, the field 7 of the motor 5 and the field 15 of the motor 13 are connected, in parallel with each other, and in series with the primary of the transformer 47; while the field 6 of the motor 5 and the field 14 of the motor 13 are connected in parallel with each other, and in series with the primary of the transformer 49. The other side of the transformers 47, 49 is connected to the power source 35, as is the other side of each of the fields 6, 7, 14 and 15. Thus, as illustrated, all four of the fields 6, 7, 14 and 15 are simultaneously energized through the transformers 47, 49 and the rotors 8 and 16, due to the equal opposing torque of the related fields upon each, are not urged to rotation.

The impedance of the primary of a transformer is dependent upon the current flowing through the secondary winding. Thus, the impedance of the primary of a transformer whose secondary winding is open-circuited is relatively greater compared to a similar transformer whose secondary winding is close-circuited. In my invention I make use of this principle, as under normal conditions a pulsating direct-current will pass through the output circuit of the thermionic discharge devices which will be of sufficient value to reduce the impedance of the primary winding of each of the transformers 47, 49 so that the opposed fields of the connected motors will be energized to a substantially normal amount. Inasmuch as the opposed fields in each motor are energized equally, then due to the characteristics of the motors as previously described, the rotors will not be urged to rotation in either direction.

However, upon rendering one of the devices 40, 44 non-conducting, a corresponding change in impedance of the primary of the related transformer will vary the strength of the connected field winding and the motors will be allowed to rotate in one direction or the other.

Upon variation in temperature, as indicated by a change in thermocouple potential and corresponding movement of the galvanometer needle, for an increment of time proportional to the change in temperature, a circuit will be closed changing the normal potential relation between the grid and cathode of one of the electron discharge devices, and thereby open-circuiting the output circuit of that device. The impedance of the primary of the transformer having its secondary connected in that output circuit will then be increased to such a value as to substantially de-energize the field of the related motor, and inasmuch as the other field of the respective motor will be normally energized, rotation of the motor in desired direction will ensue.

It will, of course, be evident that if the galvanometer needle 22 departs from neutral position in one direction, it will engage the contact 23 through a portion of the cycle of the cam 34, whereby for a portion of each period, the discharge device 44 will be rendered non-conducting and the fields 6 and 14 will be correspondingly weakened relative to the fields 7 and 15. When this occurs, the rotors 8 and 16 will be angularly positioned in desired direction and the arms 9, 17B and 17 will move to a new position representative of the value of the new temperature, and through means to be later described, the arm 17 will actuate the valve 3 for control of the fuel supply to the furnace. Should the galvanometer needle 22 be deflected in the opposite direction, then its engagement with the contact 24 will effect an opening circuit of the discharge device 40 and with corresponding change in the impedance of the primary of the transformer 47, the fields 6 and 14 will be weakened, whereby the rotors 8 and 16 will be caused to rotate in the opposite direction. Thus, the arm 9 will indicate relative to the index 10 and record on the chart 11 continuously the value of the temperature of the thermocouple 4, while simultaneously the potentiometer circuit will be balanced through movement of the arm 17B along the potentiometer resistance 18, and the supply of fuel to the furnace will be controlled through positioning of the arm 17.

It is, of course, to be understood that movement of the rotor 16 and, correspondingly, of the contact arm 17B along the potentiometer resistance 18, tends to balance the relation of potentials wherein when such balance is reached, the galvanometer needle 22 will have returned to its neutral position wherein, upon reciprocation of the cams 28, 34, 29, no engagement of the needle 22 with the contacts 23, 24 will occur, and no further change in the indication, recording or control will take place until the next deviation of temperature.

It will further be understood that I may apply to the arrangement and circuit which I have disclosed, any desired cold junction temperature compensation or standardizing circuit, but inasmuch as these form no part of my present invention, I have not felt it necessary to show them.

I will now explain the control by fluid pressure means, of the regulating valve 3, from a positioning of the arm 17 by the rotor 16. From the arm 17 is pivotally suspended a link 50, comprising a pilot moved vertically relative to a pilot casing 51 for control of air under pressure admitted to the casing 51 from a source of supply A. The novel features of the pilot valve assembly provide a fluid pressure to control the valve 3, dependent upon the axial positioning of the pilot stem 50 and in turn upon the positioning of the arm 17.

Air under pressure admitted to the casing 51 from the source A leaves the casing 51 through a pipe 52, to a metallic bellows 53, spring opposed, for positioning valve 3. The throttled position of the valve 3 in the fuel supply line is then proportional to the pressure effective within the bellows 53 and, in turn, to the pressure supplied at the outlet of the pilot casing 51.

I show at Fig. 2 the arrangement and construction of the pilot valve assembly, in section and to enlarged scale.

As is common in this art, the pilot comprises a stem 50 having enlargements 55 known as lands, positioned axially in the pilot casing 51 relative to ports for controlling the passage of air or other desirable pressure fluid. Air under pressure is admitted to the interior of the pilot casing 51 from a point of supply A, and the positioning therein of the pilot 50 controls air pressure in the discharge pipe 52. Within the casing 51 are sleeves 56, 57 recessed slightly at joining points 58 to provide a thin, annular port adjacent the upper of the two lands 55 and which port communicates by proper passages with the outlet pipe 52.

The land 55 is shown as spherical, although it may be formed of any desired contour such as conical or slow tapered. This pilot has a number of features which distinguish clearly from those pilot valves now known in the art which are generally of a type controlling the quantity of fluid through the related ports and are usually of a type which must be returned, either through movement of the pilot stem or of the pilot sleeve, to a shutoff position, in order that the functioning of the device as a whole will be accomplished in desired manner. The present pilot is in the nature of a positioning device, giving a definite loading pressure at the port 58 and the outlet pipe 52 for each axial position of the pilot stem, rather than a quantity control of flow through the port.

With a constant bleed of air past lands 55 to the atmosphere and full supply pressure at the interior of the sleeve between the lands, there will be a definite gradation of pressure from the space 59, interior of the sleeves and surrounding the stem 50, to the point of least clearance between the lands 55 and the sleeves, namely the point of the greatest diameter of the lands 55. Surrounding the upper land in the shown position is the narrow outlet or discharge port 58 which may be only a few thousandths of an inch in a direction axial to the assembly. A definite air pressure will exist in port 58, depending upon the axial positioning of the adjacent land 55 and for every point of such positioning (upward in Fig. 2) until full pressure of the space 59 is effective at 52.

The control of pressure fluid by the pilot is in the nature of supplying to the bellows 53 a pressure accurately depending upon the axial positioning of the pilot within the casing, and wherein such pressure-position relation may be definitely controlled by the shaping of the land 55. Certain features of the pilot valve and fluid pressure control system are disclosed and claimed in the patent to Clarence Johnson, No. 2,054,464 issued September 15, 1936.

It will be readily understood that the rotor 16 is caused to move when there are changes in the temperature at the thermocouple 4 and such movement results in a variation of air pressure within the metallic bellows 53 for positioning the fuel valve 3.

In order that I may vary the predetermined desirable temperature to be maintained at the thermocouple 4, I arrange adjustable means for moving the motor 13 as a whole relative to a fixed point and relative to the pilot casing 51. I provide that the motor 13 and slide wire 18 be mounted upon a base 60 in a manner pivoted substantially around the center of the rotor 16 and capable of rotation around such center through the agency of a screw 61, threaded through fixed parts. I may desirably calibrate the movement of the base by means of a pointer 62 relative to a fixed index 63 so that I can move the base to an indicated desirable temperature to be maintained at the thermocouple 4 and vary such predetermined temperature as desired through turning the screw 61.

The motor 5 and indicating-recording mechanism associated therewith may be located remotely relative to the feeler mechanism, the furnace, and/or the control mechanism.

At Fig. 3 I illustrate diagrammatically a portion of the general arrangement wherein the motor 13 positions a contact arm relative to the slide wire potentiometer and, at the same time, positions an arm 17C for moving a valve stem 17D of the fuel supply valve 3B.

While I have illustrated the invention as relating particularly to the measurement of temperature and the use of thermocouples, still I contemplate that the arrangement may be utilized for the measurement and control of other variables or characteristics in the operation of apparatus and which may be of physical, chemical, thermal, electrical, or other nature. Such variables may be flow, temperature, pressure, or ratio of variables, etc.

While in the description and appended claims, for the sake of simplicity and clearness I have used the terms "slide wire resistance" and "slide wire potentiometer", it is to be understood that I include in this term any variable resistance capable of performing the same function.

So far as the feeler and amplifying mechanism is concerned, it is not necessary that the movable portion illustrated as the galvanometer needle 22 be the movable portion of a galvanometer, but such movable part might be positioned by a Bourdon tube sensitive to pressure or temperature, or by the indicator arm of a fluid flow meter or by any similar device having a relatively small available power which is desirably amplified for recording, indicating and/or control therefrom, and wherein electrical effects may be produced in amplified form of constant magnitude, but of duration or for a percentage of the period of operation dependent upon the amount of departure of the variable from a predetermined value.

While I have illustrated a control by the motor 13 of a fluid pressure such as air, I may equally as well use oil, water, or any other of the well known pressure fluids.

While I have illustrated and described certain preferred embodiments of my invention, it is to be understood that I am not to be limited thereby except as to the claims in view of prior art.

What I claim as new, and desire to secure by Letters Patent of the United States, is:—

1. In combination, a thermo-couple sensitive to a variable, a potentiometer, a galvanometer under the joint control of the thermo-couple and the potentiometer, a motor having opposed fields for varying the effect of the potentiometer on the galvanometer, a pair of electron discharge devices each having a grid, a cathode and an anode, the cathode and anode of each of said devices connected in circuit with one of the motor fields, means for maintaining a normal potential relation between the grid and cathode of said devices, means controlled by the galvanometer for periodically in accordance with changes in the variable changing the grid-cathode relationship, fluid pressure actuated control means for the variable operated by said motor, a second reversible motor connected in said circuit, and indicating means actuated by the second motor.

2. In combination with a thermocouple sensitive to changes in a variable, a galvanometer displaced from a neutral position in accordance with changes in potential produced by said thermocouple, a potentiometer for returning said galvanometer to the neutral position, reversible motor means having opposed fields for varying the effect of the potentiometer on said galvanometer, a plurality of electric circuits, one of said fields connected in each of said circuits, an electron discharge device having a grid, a cathode and an anode connected in each of said circuits, means for maintaining a normal potential relation between said grids and cathodes, and means under the control of said galvanometer periodically for increments of time proportional to changes in the variable changing the potential relation, fluid pressure actuated control means for an agent affecting the variable operated by said motor, a second reversible motor having opposed fields, each of said fields connected in one of said circuits, and indicating means actuated by the second motor.

3. In combination with a thermocouple sensitive to changes in a variable, a galvanometer displaced from a neutral position in accordance with changes in potential produced by said thermocouple, a potentiometer for returning said galvanometer to the neutral position, reversible motor means having opposed fields for varying the effect of the potentiometer on said galvanometer, a plurality of electric circuits, one of said fields connected in each of said circuits, an electron discharge device having a grid, a cathode and an anode connected in each of said circuits, means for maintaining a normal potential relation between the grid and cathode of each of said devices, and means under the control of said galvanometer periodically for increments of time proportional to changes in the variable for changing the potential relation, a member positioned by said motor, a pilot valve having a movable valve member pivotally connected to said member for establishing a fluid pressure proportional to the position of said member, control means for an agent affecting or maintaining said variable operated by the fluid pressure established by said pilot valve, a second reversible motor having opposed fields, each of said fields connected in one of said circuits, and indicating means actuated by the second motor.

4. In combination, a thermo-couple sensitive to a variable, a potentiometer, a galvanometer under the joint control of the thermo-couple and the potentiometer, a motor having opposed fields for varying the effect of the potentiometer on the galvanometer, a pair of electron discharge devices each having a grid, a cathode and an anode, the cathode and anode of each of said devices connected in circuit with one of the motor fields, means for maintaining a normal potential relation between the grid and cathode of said devices, means controlled by the galvanometer for periodically in accordance with changes in the variable changing the grid-cathode relationship, control means for the variable operated by said motor, a second reversible motor connected in said circuit, and indicating means actuated by the second motor.

5. In combination with a thermo-couple sensitive to changes in a variable, a galvanometer displaced from a neutral position in accordance with changes in potential produced by said thermocouple, a potentiometer for returning said galvanometer to the neutral position, reversible motor means having opposed fields for varying the effect of the potentiometer on said galvanometer, a plurality of electric circuits, one of said fields connected in each of said circuits, an electron discharge device having a grid, a cathode and an anode connected in each of said circuits, means for maintaining a normal potential relation between said grids and cathodes, and means under the control of said galvanometer periodically for increments of time proportional to changes in the variable changing the potential relation, control means for an agent affecting the variable operated by said motor, a second reversible motor having opposed fields, each of said fields connected in one of said circuits, and indicating means actuated by the second motor.

RAYMOND D. JUNKINS.